US012649299B2

(12) United States Patent
Kim et al.

(10) Patent No.: US 12,649,299 B2
(45) Date of Patent: Jun. 9, 2026

(54) METHOD AND APPARATUS FOR MANUFACTURING DISPLAY DEVICE

(71) Applicants: SAMSUNG DISPLAY CO., LTD., Yongin-si (KR); TOPTEC CO., LTD., Gumi-si (KR)

(72) Inventors: So Hyun Kim, Yongin-si (KR); Yang Han Son, Yongin-si (KR); Sang Sik Cho, Anyang-si (KR); Sang Hee Choi, Yongin-si (KR)

(73) Assignees: Samsung Display Co., Ltd., Yongin-si (KR); Toptec Co., Ltd., Gumi-si (KR)

( * ) Notice: Subject to any disclaimer, the term of this patent is extended or adjusted under 35 U.S.C. 154(b) by 33 days.

(21) Appl. No.: 18/759,655

(22) Filed: Jun. 28, 2024

(65) Prior Publication Data

US 2024/0351308 A1    Oct. 24, 2024

Related U.S. Application Data

(60) Continuation of application No. 18/305,862, filed on Apr. 24, 2023, now Pat. No. 12,049,072, which is a
(Continued)

(30) Foreign Application Priority Data

Apr. 25, 2018    (KR) ........................ 10-2018-0048074

(51) Int. Cl.
B32B 7/12        (2006.01)
B29C 53/04      (2006.01)
(Continued)

(52) U.S. Cl.
CPC ................ B32B 7/12 (2013.01); B29C 53/04 (2013.01); B29C 65/48 (2013.01);
(Continued)

(58) Field of Classification Search
None
See application file for complete search history.

(56) References Cited

U.S. PATENT DOCUMENTS 9,232,571 B2    1/2016  Ahn et al.
9,439,315 B2    9/2016  Lee et al.
(Continued)

FOREIGN PATENT DOCUMENTS

CN        103545340 A    1/2014
CN        107046108 A    8/2017
(Continued)

*Primary Examiner* — Barbara J Musser
(74) *Attorney, Agent, or Firm* — Womble Bond Dickinson (US) LLP

(57) ABSTRACT

A method of manufacturing a display device includes: preparing a cover window including a bent part on a side surface thereof, and a guide film including a surface on which a display panel and an adhesive layer are arranged; arranging the cover window and the guide film in a face-to-face manner such that the adhesive layer faces the cover window; seating the guide film onto a seating pad of a first jig; pre-forming the display panel by bringing opposite ends of the guide film into close contact with opposite side surfaces of the seating pad using a pair of push members; and joining the display panel with the cover window by bringing the adhesive layer into contact with the cover window.

15 Claims, 14 Drawing Sheets

Related U.S. Application Data division of application No. 17/549,596, filed on Dec. 13, 2021, now Pat. No. 11,667,106, which is a division of application No. 16/379,650, filed on Apr. 9, 2019, now Pat. No. 11,198,271.

(51) Int. Cl.

| | |
|---|---|
| *B29C 65/00* | (2006.01) |
| *B29C 65/48* | (2006.01) |
| *B32B 37/10* | (2006.01) |
| *B32B 38/00* | (2006.01) |
| *B32B 38/18* | (2006.01) |
| *G02F 1/1333* | (2006.01) |

(52) U.S. Cl.

CPC .......... *B29C 66/7465* (2013.01); *B32B 37/10* (2013.01); *B32B 38/0012* (2013.01); *B32B 38/1866* (2013.01); *G02F 1/133325* (2021.01); *B32B 2457/206* (2013.01); *G02F 1/133331* (2021.01)

(56) References Cited

U.S. PATENT DOCUMENTS

| | | | |
|---|---|---|---|
| 9,981,417 | B2 | 5/2018 | Park et al. |
| 10,483,098 | B2 | 11/2019 | Um et al. |
| 10,493,687 | B2 | 12/2019 | Jeon et al. |
| 10,518,515 | B2 | 12/2019 | Choi et al. |
| 2008/0142791 | A1 | 6/2008 | Kim et al. |
| 2014/0179040 | A1 | 6/2014 | Ramadas et al. |
| 2016/0093833 | A1 | 3/2016 | No et al. |
| 2017/0050424 | A1 | 2/2017 | Son et al. |
| 2017/0263492 | A1* | 9/2017 | Son ...................... G02F 1/1303 |
| 2017/0324060 | A1 | 11/2017 | Kim et al. |
| 2019/0098742 | A1 | 3/2019 | Takahashi et al. |
| 2019/0098767 | A1 | 3/2019 | Hasegawa et al. |
| 2019/0355763 | A1 | 11/2019 | Chen et al. |
| 2021/0323293 | A1 | 10/2021 | Kim et al. |

FOREIGN PATENT DOCUMENTS

| | | | |
|---|---|---|---|
| CN | 107342373 | A | 11/2017 |
| CN | 108598278 | A | 9/2018 |
| CN | 109037460 | A | 12/2018 |
| DE | 1183353 | B | 12/1964 |
| KR | 10-2015-0001142 | A | 1/2015 |
| KR | 10-2015-0048547 | A | 5/2015 |
| KR | 10-2015-0053084 | A | 5/2015 |
| KR | 10-2015-0059566 | A | 6/2015 |
| KR | 10-2015-0077829 | A | 7/2015 |
| KR | 10-2017-0023267 | A | 3/2017 |
| KR | 10-2017-0051597 | | 5/2017 |
| KR | 10-2017-0094019 | | 8/2017 |
| KR | 10-2018-0025429 | A | 3/2018 |
| KR | 10-1923716 | B1 | 11/2018 |
| WO | WO 2019/109674 | A1 | 6/2019 |

\* cited by examiner

NADA     ADA     NADA 120,130

METHOD AND APPARATUS FOR MANUFACTURING DISPLAY DEVICE

CROSS-REFERENCE TO RELATED APPLICATIONS

This application is a continuation of U.S. patent application Ser. No. 18/305,862, filed on Apr. 24, 2023, now U.S. Pat. No. 12,049,072, which is a divisional of U.S. patent application Ser. No. 17/549,596, filed on Dec. 13, 2021, now U.S. Pat. No. 11,667,106, which is a divisional of U.S. patent application Ser. No. 16/379,650, filed on Apr. 9, 2019, now U.S. Pat. No. 11,198,271, which claims priority to and the benefit of Korean Patent Application No. 10-2018-0048074, filed on Apr. 25, 2018, the entire contents of all of which are incorporated herein by reference.

BACKGROUND

1. Field

Aspects of embodiments of the present disclosure relate to a method and apparatus for manufacturing a display device.

2. Description of Related Art

Recently, as the number of consumers who place emphasis on designs of electronic devices and ease of use has increased, the electronic devices have been diversified in design. As a result, display devices have also been diversified in design. For example, a display device may include a bent part having a bent or curved shape on each of opposite side edges thereof.

SUMMARY

Aspects of embodiments of the present disclosure are directed to a method and apparatus for manufacturing a display device including a bent part.

According to one or more embodiments of the present disclosure, a method of manufacturing a display device includes: preparing a cover window including a bent part on a side surface thereof, and a guide film including a surface on which a display panel and an adhesive layer are arranged; arranging the cover window and the guide film in a face-to-face manner such that the adhesive layer faces the cover window; seating the guide film onto a seating pad of a first jig; pre-forming the display panel by bringing opposite ends of the guide film into close contact with opposite side surfaces of the seating pad using a pair of push members; and joining the display panel with the cover window by bringing the adhesive layer into contact with the cover window.

In an embodiment, the pre-forming of the display panel may include deforming the display panel in a shape corresponding to a shape of the cover window.

In an embodiment, the pre-forming of the display panel may include moving a region of each of the push members or a region of the guide film into a corresponding one of grooves formed in the respective opposite side surfaces of the seating pad.

In an embodiment, the preparing of the guide film may include: attaching the display panel to a central region of the guide film such that the opposite ends of the guide film are exposed; and forming the adhesive layer on an upper portion of the display panel before or after the attaching of the display panel.

In an embodiment, the arranging of the cover window and the guide film in the face-to-face manner may include: transferring the cover window to a position over the first jig using a second jig; and holding the opposite ends of the guide film using a pair of clamps and arranging the guide film between the first jig and the cover window.

In an embodiment, the arranging of the cover window and the guide film in the face-to-face manner may further include moving, when the second jig moves, at least one of the first jig and the pair of clamps in response to the movement of the second jig.

In an embodiment, the seating the guide film onto the seating pad of the first jig may include bringing a rear surface of the guide film into close contact with the seating pad by moving at least one of the seating pad and the pair of clamps.

In an embodiment, the pre-forming of the display panel may include concurrently moving the pair of clamps and the pair of push members to positions close to the opposite side surfaces of the seating pad.

In an embodiment, the pre-forming of the display panel may include individually moving the pair of clamps and the pair of push members to positions close to the opposite side surfaces of the seating pad.

In an embodiment, the pre-forming of the display panel may include: arranging the pair of push members on respective opposite sides of the seating pad; and moving the pair of push members toward the grooves formed in the opposite side surfaces of the seating pad, and pressing the opposite ends of the guide film such that the opposite ends of the guide film are brought into close contact with the respective opposite side surfaces of the seating pad.

In an embodiment, the method may further include removing the guide film from the first jig after the joining of the display panel with the cover window.

According to one or more embodiment of the present disclosure, an apparatus for manufacturing a display device includes: a first jig including a seating pad including grooves in respective opposite side surfaces thereof, and a first plate coupled to a lower portion of the seating pad; a pair of clamps at respective opposite sides of the first jig; a pair of push members arranged, along with the respective clamps, at the respective opposite sides of the first jig, each of the pair of push members having a size corresponding to an associated one of the grooves of the seating pad; a drive unit configured to move the push members to positions close to the respective grooves of the seating pad; and a second jig over the first jig.

In an embodiment, each of the pair of push members may include a roller or a bar.

In an embodiment, the pair of clamps may include a first clamp at a first side of the first jig, and a second clamp at a second side of the first jig such that the second clamp faces the first clamp. The pair of push members may include a first push member around the first clamp, and a second push member around the second clamp.

In an embodiment, the first clamp and the first push member may be integrally connected or mounted to each other, and the second clamp and the second push member may be integrally connected or mounted to each other.

In an embodiment, the drive unit may include: a first clamp drive unit configured to move the first clamp and the first push member; and a second clamp drive unit configured to move the second clamp and the second push member.

In an embodiment, the first and the second clamps may be provided separately from the first and the second push members, and the drive unit may include separate drive units configured to respectively move the first and second clamps and the first and second push members.

In an embodiment, the seating pad may include an upper surface including a convex curved surface, and the opposite side surfaces, each of which has a convex curved surface on an upper end region thereof extending from the upper surface to the corresponding groove.

In an embodiment, in the seating pad, at least the upper surface and the upper end regions of the opposite side surfaces may be made of an elastic material.

In an embodiment, a central portion of the upper surface may have a hardness less than a hardness of the upper end region of each of the opposite side surfaces.

In an embodiment, the second jig may include a second plate facing the seating pad. The second plate may include side surfaces having shapes corresponding to the respective upper end regions of the opposite side surfaces of the seating pad.

According to a method and apparatus for manufacturing a display device in accordance with one or more embodiments of the present disclosure, a flexible display panel may be pre-formed in a shape substantially the same or similar to a cover window, and then attached to one surface of the cover window. As a result, the display panel may be reliably attached to even the cover window that includes a bent part having an angle (e.g., a predetermined angle) and/or curvature or more.

BRIEF DESCRIPTION OF THE DRAWINGS

FIG. 4 is a diagram illustrating an apparatus for manufacturing a display device in accordance with an embodiment of the present disclosure.

FIG. 5 is a perspective view illustrating a portion of the manufacturing apparatus shown in FIG. 4.

FIG. 6 is a diagram illustrating a portion of an apparatus for manufacturing a display device in accordance with an embodiment of the present disclosure.

FIGS. 10A to 10F are diagrams sequentially illustrating a method of manufacturing a display device in accordance with an embodiment of the present disclosure.

DETAILED DESCRIPTION

Figures 1, 2:
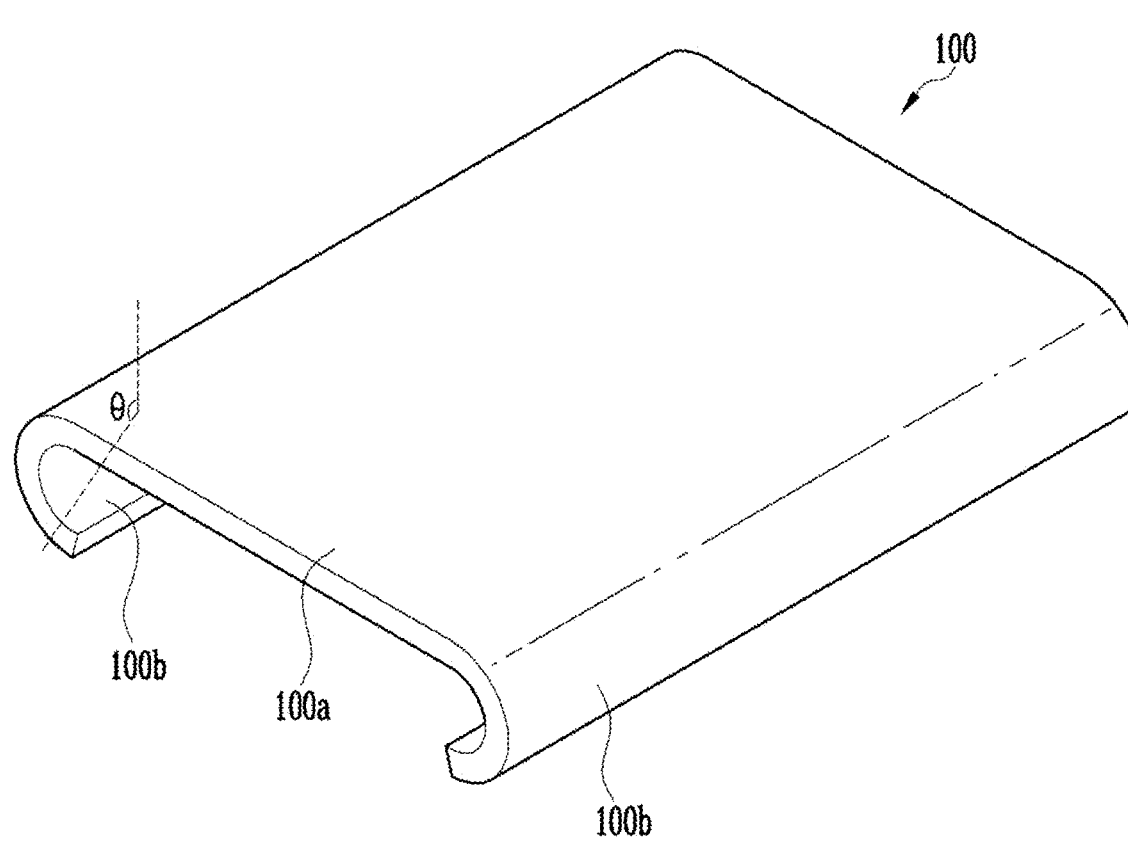
FIG. 1 is a diagram illustrating a display device in accordance with an embodiment of the present disclosure.
FIG. 2 is a cross-sectional view illustrating the display device shown in FIG. 1.

Embodiments and details of the present disclosure are described with reference to the accompanying drawings in order to describe the present disclosure in further detail such that those having ordinary knowledge and skill in the technical field to which the present disclosure pertains can easily practice the present disclosure. However, the following embodiments are merely exemplary. In other words, the present disclosure may be modified and practiced in various forms rather than being limited by the following embodiments. It is to be understood that when an element is referred to as being "coupled" to another element, it may be directly coupled to the element or coupled thereto with one or more other elements interposed therebetween.

Some elements which are not directly related to the features of the present disclosure in the drawings may be omitted to more clearly explain the present disclosure. Further, sizes, ratios, etc. of some elements in the drawings may be exaggerated for purposes of clarity. It should be noted that the same reference numerals are used to designate the same or similar elements throughout the drawings.

FIG. 1 is a diagram illustrating a display device 100 in accordance with an embodiment of the present disclosure; and FIG. 2 is a cross-sectional view of the display device 100 shown in FIG. 1. Although in the embodiment of FIG. 1 there is illustrated the display device 100, the opposite side edges of which have convex curved surfaces, the shape of the display device 100 is not limited thereto.

Referring to FIG. 1, the display device 100 in accordance with the embodiment of the present disclosure includes a front surface part 100a, and side surface parts 100b extending from the front surface part 100a. For example, the side surface parts 100b may be integrally connected with the respective opposite side edges of the front surface part 100a.

In an embodiment, the front surface part 100a may be substantially planar. However, the shape of the display device 100 is not limited thereto. For example, in an embodiment of the present disclosure, at least one region of the front surface part 100a may have an angle and/or a curvature within a range (e.g., a predetermined range).

In an embodiment, each side surface part 100b may be bent from the front surface part 100a at an angle (e.g., a predetermined angle) (or within a predetermined angular range), or may have a curved surface which is curved at a curvature (e.g., a predetermined curvature) (or within a predetermined curvature range). For example, each side surface part 100b may be embodied in the form of a bent part which is curved at a predetermined angle and/or a curvature from a corresponding one of the opposite side edges of the front surface part 100a. For example, the side surface part 100b may be a bent part having an angle (θ) of 90° or more, based on the front surface part 100a, and/or a comparatively large curvature corresponding to the angle (θ). However, the present disclosure is not limited to this structure.

Referring to FIG. 2, the display device 100 may include a cover window 110, and an adhesive layer 120 and a display panel 130 which are disposed on a surface of the cover window 110. For example, the adhesive layer 120 and the display panel 130 may be successively disposed on an inner surface (e.g., a rear surface) of the cover window 110.

The cover window 110 may include a front surface part 110a and side surface parts 110b. The cover window 110 having the foregoing structure may have bent parts on at least opposite side surfaces thereof. For example, the front surface part 110a of the cover window 110 may be substantially planar, and each of the side surface parts 110b may be embodied in the form of a bent part which is curved at a predetermined angle and/or curvature from a corresponding one of the opposite sides of the front surface part 110a. In an embodiment, the front surface part 110a and the side surface parts 110b of the cover window 110 may be integrally formed into a single piece, but the present disclosure is not limited thereto.

The cover window 110 may be a hard (or rigid) window formed of glass or reinforced glass, or a soft (or flexible)

window formed of a thin film made of a material such as polyimide (PI). However, the material and properties of the cover window 110 are not limited to a specific material and properties. For example, the cover window 110 may be embodied in the form of a window which may be formed of any of various known materials. Further, the cover window 110 may have a single- or multi-layer structure. The structure of the cover window 110 is not limited to a specific structure.

The adhesive layer 120 is disposed between the cover window 110 and the display panel 130 to couple the cover window 110 with the display panel 130. In an embodiment, the adhesive layer 120 may be formed of a transparent adhesive, such as optical clear adhesive (OCA). However, the adhesive layer 120 may be formed of any of various known adhesive materials. The adhesive layer 120 may be formed on an upper portion of the display panel 130 in any of various schemes; for example, the adhesive layer 120 may be provided in the form of a film and adhere to an upper portion of the display panel 130 (e.g., an upper portion of a thin film encapsulation (TFE) layer), or may be provided in the form of a fluid or material and applied to the upper portion of the display panel 130.

The display panel 130 may adhere to a surface of the cover window 110 by the adhesive layer 120. For example, the display panel 130 may adhere to the inner surface (e.g., the rear surface) of the cover window 110. In an embodiment, the display panel 130 may have a width less than that of the cover window 110. For example, the display panel 130 may have a width less than that of the cover window 110 by a degree corresponding to the thicknesses of the cover window 110 and the adhesive layer 120.

In an embodiment, the display panel 130 may be a flexible display panel, such as satisfying predetermined flexibility conditions. To this end, the display panel 130 may be a display panel formed on a flexible substrate (e.g., a thin film) and may have a small thickness. For example, the display panel 130 may be a spontaneous emission type display panel such as an organic light-emitting display panel which may be embodied to have a small thickness, but it is not limited thereto. In other words, the display panel 130 may be a display panel which may have any of various well-known structures and/or types.

In some embodiments, the display panel 130 may integrally include a touch sensing layer (not shown), or a touch sensing layer may be formed and/or disposed on at least one surface (e.g., a front surface and/or a rear surface) of the display panel 130. Alternatively, in an embodiment, in lieu of the display panel 130, a touch screen panel may independently adhere to a surface of the cover window 110.

In an embodiment, the display panel 130 may include a front surface part 130a corresponding to (e.g., overlapping with) the front surface part 110a of the cover window 110, and side surface parts 130b corresponding to the respective side surface parts 110b of the cover window 110. In an embodiment, the side surface parts 130b may be integrally coupled with the front surface part 130a, and each may have a bent part having a shape corresponding to the associated side surface part 110b of the cover window 110. For example, each of the side surface parts 130b of the display panel 130 may be embodied in the form of a curved surface part having a convex shape.

Here, the term "corresponding shape" may mean, for example, "substantially same or similar shape". For example, each side surface part 130b of the display panel 130 may have a shape that is the same or similar to that of the corresponding side surface part 110b of the cover window 110, and may have substantially the same size and/or shape as that of the side surface part 110b of the cover window 110 such that, when moved and/or enlarged at a predetermined ratio in each direction in a three-dimensional space, the side surface part 130b of the display panel 130 can overlap with the side surface part 110b of the cover window 110. In other words, the display panel 130 may have a size and/or a shape capable of coming into close contact with the cover window 110, with the adhesive layer 120 interposed therebetween.

As such, in an embodiment of the present disclosure, the display panel 130 may be disposed on corresponding surfaces (e.g., the inner surfaces) of the front surface part 110a and the side surface parts 110b of the cover window 110. In an embodiment, pixels may also be disposed in the side surface parts 130b of the display panel 130. In this case, an image (e.g., a predetermined image) may be displayed not only on the front surface part 100a but also on the side surface parts 100b. Therefore, the utilization of the display device 100 may be improved.

Figure 3:
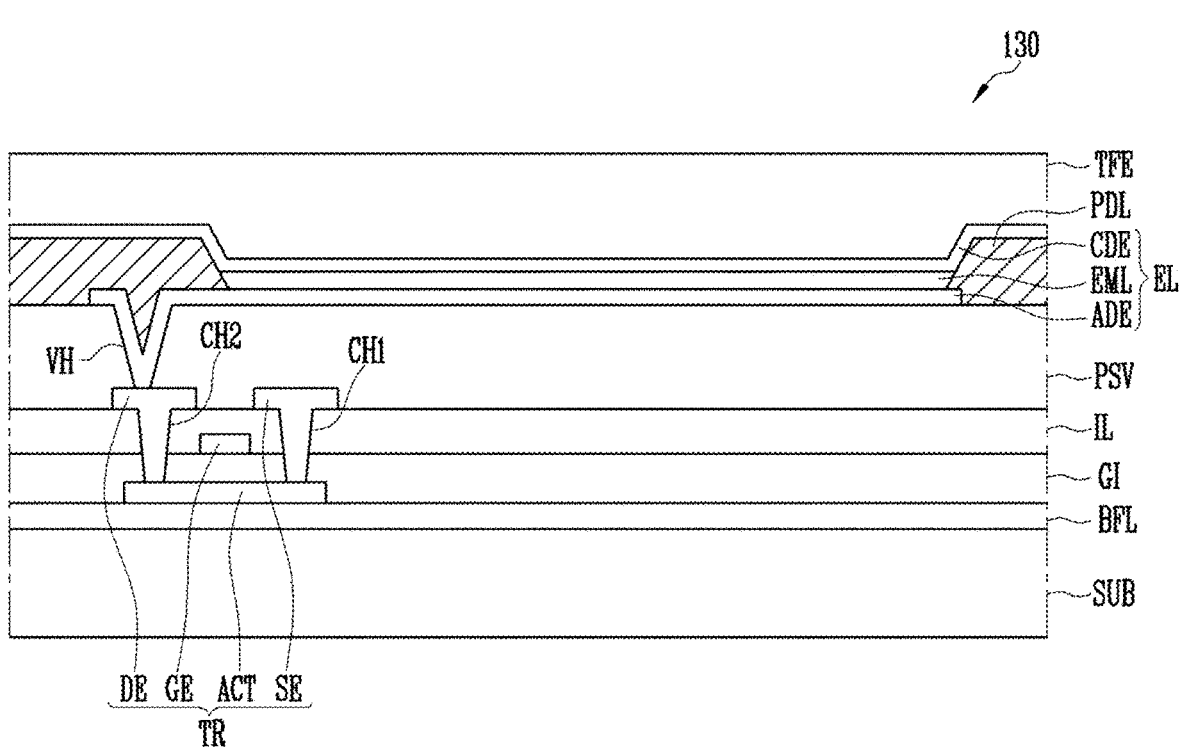
FIG. 3 is a cross-sectional view illustrating a portion of a display panel in accordance with an embodiment of the present disclosure.

FIG. 3 is a cross-sectional view illustrating a portion of the display panel 130 in accordance with an embodiment of the present disclosure. FIG. 3 illustrates an organic light-emitting display panel as an example of a display panel which may be applied to the present disclosure. Furthermore, for the sake of explanation, FIG. 3 illustrates a cross-sectional view of a region of the organic light-emitting display panel, for example, a region of a pixel.

Referring to FIG. 3, the display panel 130 may include a base substrate SUB, and a transistor TR and a light emitting element EL which are formed over a surface of the base substrate SUB. A plurality of pixels may be disposed over a surface of the base substrate SUB. The transistor TR and the light emitting element EL may be formed in each pixel region. Each pixel region may include at least one other transistor and/or capacitor (not shown).

The base substrate SUB may be a hard or soft substrate, and the material thereof is not limited to a specific material. For example, in an embodiment of the present disclosure, the base substrate SUB may be embodied in the form of a flexible thin film or a thin metal substrate. However, the base substrate SUB may be formed of any of various known substrate materials. The base substrate SUB may have a single- or multi-layer structure, and the structure of the base substrate SUB is not limited to a specific structure.

In an embodiment, a buffer layer BFL may be formed on the surface of the base substrate SUB. The buffer layer BFL may function to prevent or substantially prevent impurities from diffusing from the base substrate SUB and enhance the flatness of the base substrate SUB. The buffer layer BFL may be provided in a single-layer structure, or a multi-layer structure having at least two or more layers. In an embodiment, the buffer layer BFL may be an inorganic insulating layer formed of inorganic material. For example, the buffer layer BFL may be formed of silicon nitride, silicon oxide, silicon oxy-nitride, etc. In the case in which the buffer layer BFL has a multi-layer structure, the respective layers may be formed of a same material or different materials. In an embodiment, the buffer layer BFL may be omitted.

In each pixel region over the buffer layer BFL, various circuit elements including at least one transistor TR for forming a pixel circuit may be formed. During a process of forming the circuit elements, lines including at least one power supply line and/or various signal lines may be formed along with the circuit elements.

The transistor TR includes an active layer ACT, a gate electrode GE, a source electrode SE, and a drain electrode DE. In an embodiment, the active layer ACT may be disposed on the buffer layer BFL and formed of a semiconductor material. For example, the active layer ACT may be a semiconductor pattern formed of polysilicon, amorphous silicon, an oxide semiconductor, or the like. The active layer ACT may be formed of a semiconductor layer which is doped with impurities or not doped with impurities. Alternatively, only one region of the active layer ACT may be doped with impurities, and the other region thereof may not be doped with impurities, or the active layer ACT may be doped with impurities at different concentrations by regions.

A gate insulating layer GI is formed on the active layer ACT. The gate electrode GE may be formed on the gate insulating layer GI.

An interlayer insulating layer IL may be formed on the gate electrode GE. The source electrode SE and the drain electrode DE may be formed on the interlayer insulating layer IL. The source electrode SE and the drain electrode DE may be respectively coupled to different regions of the active layer ACT through a first contact hole CH1 and a second contact hole CH2 which pass through the gate insulating layer GI and the interlayer insulating layer IL.

A passivation layer (or a planarization layer) PSV may be formed on the source electrode SE and the drain electrode DE. The passivation layer PSV may cover the pixel circuit including the transistor TR and substantially planarize a top surface of the pixel circuit.

The light emitting element EL is formed on the passivation layer PSV. The light emitting element EL includes a first electrode ADE, a light emitting layer EML, and a second electrode CDE. In an embodiment, the light emitting element EL may be an organic light emitting diode (OLED) including an organic light emitting layer.

The first electrode ADE of the light emitting element EL may be disposed on the passivation layer PSV and be coupled to one electrode, e.g., the drain electrode DE, of the transistor TR through a via hole VH (or a third contact hole) passing through the passivation layer PSV. In an embodiment, the first electrode ADE may be an anode electrode of the light emitting element EL, but is not limited thereto.

A pixel defining layer PDL for defining a light emitting region of each pixel may be formed on the surface of the base substrate SUB on which the first electrode ADE, etc. are formed. The pixel defining layer PDL has, in the light emitting region of each pixel, an opening through which the first electrode ADE is exposed.

The light emitting layer EML is formed in each light emitting region enclosed by the pixel defining layer PDL. For example, the light emitting layer EML may be disposed on the exposed surface of the first electrode ADE. In an embodiment, the light emitting layer EML may have a multi-layer thin film structure including at least a light generation layer (LGL). For example, the light emitting layer EML may include a hole injection layer, a hole transport layer, a light generation layer, a hole blocking layer, an electron transport layer, and an electron injection layer. In an embodiment, the color of light generated from the light emitting layer EML may be one of red, green, blue, and white, but is not limited thereto.

The second electrode CDE of the light emitting element EL is formed on the light emitting layer EML. In an embodiment, the second electrode CDE may be a cathode electrode, but is not limited thereto. In an embodiment, the second electrode CDE may be formed on an entire surface of an active region of the display panel 130, but is not limited thereto.

A thin film encapsulation layer TFE for covering the second electrode CDE is formed on the second electrode CDE of the light emitting layer EL. The thin film encapsulation layer TFE may cover pixels to seal the active region including the pixels. In the case in which the thin film encapsulation layer TFE is used, the pixels may be effectively protected, the thickness of the display panel 130 may be reduced, and the flexibility of the display panel 130 may be secured.

In an embodiment, the thin film encapsulation layer TFE may have a single- or multi-layer structure. For example, the thin film encapsulation layer TFE may have a multi-layer structure including at least two inorganic layers overlapping with each other, and at least one organic layer interposed between the inorganic layers. Alternatively, in an embodiment, the thin film encapsulation layer TFE may be embodied in the form of an organic and inorganic hybrid insulating layer having a single layer structure.

Figure 4:
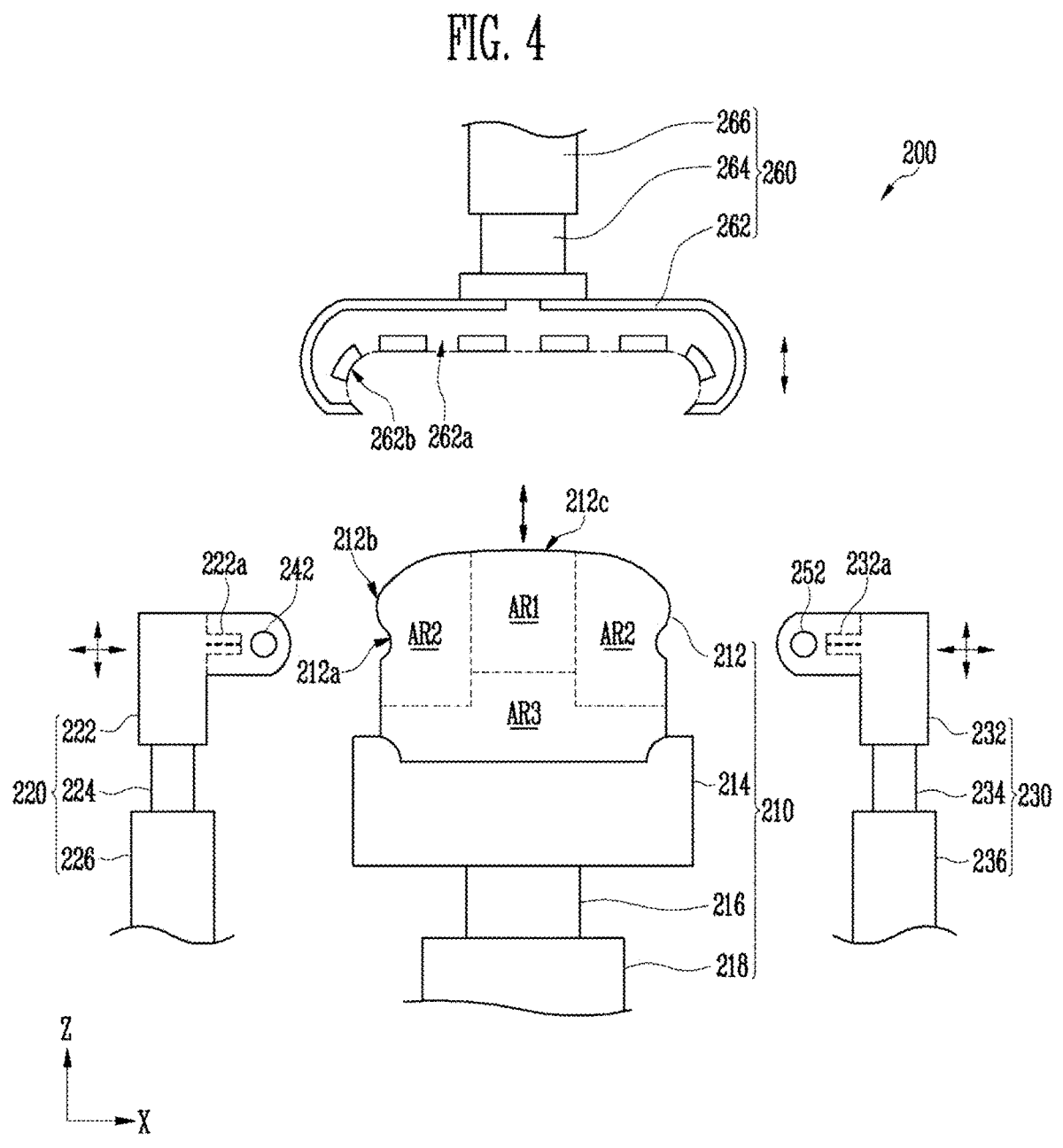
Figure 5:
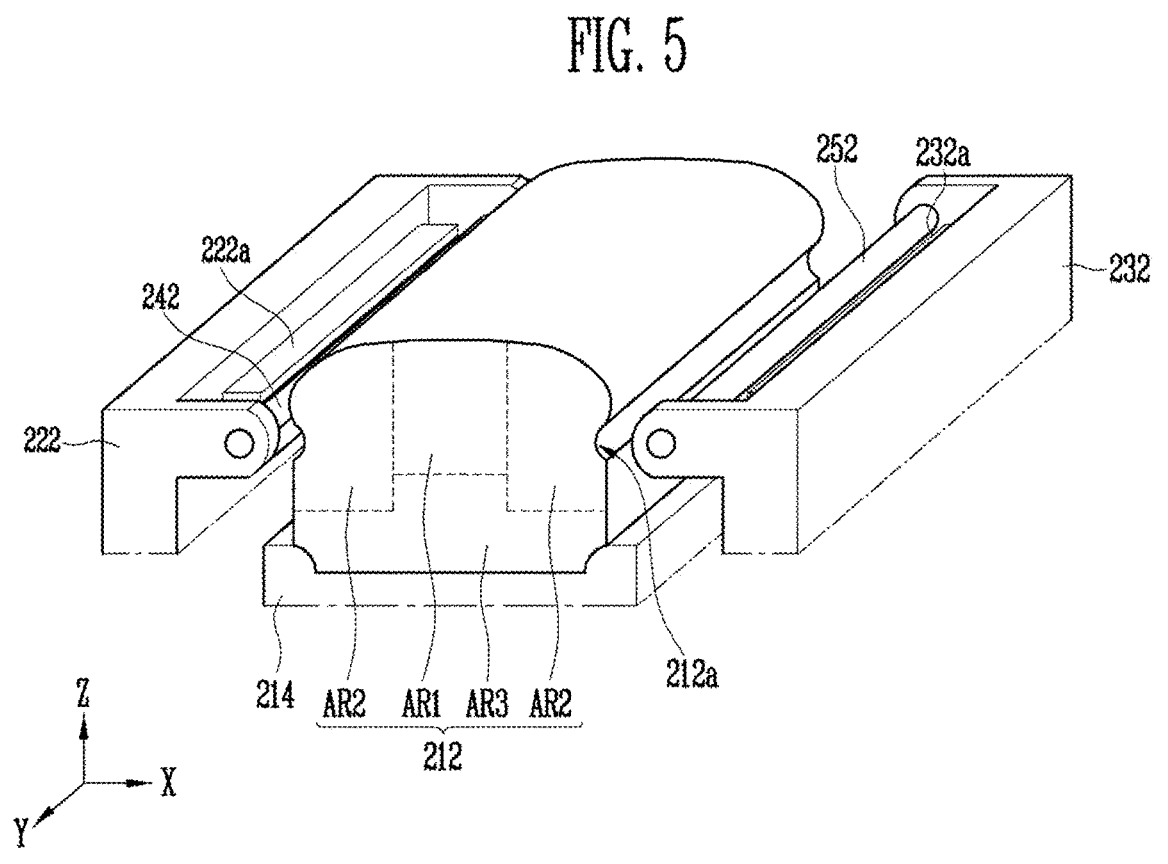

FIG. 4 is a diagram illustrating an apparatus 200 for manufacturing a display device in accordance with an embodiment of the present disclosure; and FIG. 5 is a perspective view illustrating a portion of the manufacturing apparatus 200 shown in FIG. 4.

Referring to FIGS. 4 and 5, the manufacturing apparatus 200 in accordance with the embodiment of the present disclosure includes a first jig 210, a pair of clamping units 220 and 230 disposed on opposite sides of the first jig 210, a pair of push members 242 and 252 integrally coupled or mounted to the respective clamping units 220 and 230, and a second jig 260 disposed over the first jig 210.

The first jig 210 includes a seating pad 212, and a first plate 214 coupled to the seating pad 212. In an embodiment, the first jig 210 may further include a first jig drive unit 218 configured to move the seating pad 212 (for example, in an up-and-down direction corresponding to a Z-axis direction), and a connector 216 disposed between the first plate 214 and the first jig drive unit 218. In an embodiment, the first jig drive unit 218, etc. may be regarded as separate components from the first jig 210.

In an embodiment, the seating pad 212 may include at least one groove 212a in each of the opposite side surfaces thereof. In addition, each of the opposite side surfaces of the seating pad 212 may include a bent part 212b corresponding to the shape of the second jig 260. For example, an upper end region of each of the opposite side surfaces of the seating pad 212 that extend from an upper surface 212c of the seating pad 212 to the respective grooves 212a may include the bent part 212b embodied in the form of a convex curved surface. The bent part 212b may have a shape corresponding to a bent part 262b formed on a suction surface of a second plate 262 provided in the second jig 260.

In an embodiment, the upper surface 212c of the seating pad 212 may also include a convex curved surface. For example, the upper surface 212c of the seating pad 212 may include a curved surface which has a curvature less than that of the bent part 212b formed on each of the opposite side surfaces of the seating pad 212, the curvature of the curved surface being gradually increased on opposite edges thereof connected to the respective bent parts 212b. However, the shape of the seating pad 212 is not limited thereto. For example, the seating pad 212 may have any of various shapes corresponding to the shape of the second jig 260 and/or the shape of the cover window (110 of FIG. 2) to be mounted to the second jig 260.

In an embodiment, at least one region including the upper surface 212c of the seating pad 212 may have elasticity. In an embodiment, the upper surface 212c of the seating pad 212 and the upper end regions (e.g., including at least the bent parts 212b) of the opposite side surfaces of the seating pad 212 may be made of an elastic material. Hence, during a lamination process of applying pressure to the display panel 130 and the cover window 110 that are respectively disposed on the first and second jigs 210 and 260, the display panel 130 and/or the cover window 110 may be prevented or substantially prevented from being damaged, and the pressure may be uniformly or substantially uniformly dispersed on an adhesive surface therebetween.

For example, both a top area (herein, referred to as a first area AR1) corresponding to a predetermined width on a central portion of the upper surface 212c of the seating pad 212, and side areas (herein, referred to as second areas AR2) corresponding to a region from the respective opposite sides of the upper surface 212c of the seating pad 212 to predetermined widths may be made of an elastic material, and a bottom area (herein, referred to as a third area AR3) of the seating pad 212 may be made of a comparatively hard material. For example, the first and the second areas AR1 and AR2 may be made of at least one of elastic materials, such as silicon, rubber, and flexible synthetic resin, having comparatively high flexibility and elasticity. The third area AR3 may be made of a comparatively hard material, e.g., plastic, reinforced plastic, or metal, having comparatively high hardness.

In an embodiment, the first and the second areas AR1 and AR2 may have different hardnesses. For example, during the lamination process for the display panel 130 and the cover window 110, the first area AR1 requiring a comparatively large displacement may be manufactured to have a hardness less than that of the second area AR2 requiring a comparatively small displacement.

The first plate 214 is disposed under the seating pad 212 and coupled with the seating pad 212. In an embodiment, the first plate 214 may be made of a comparatively hard material, e.g., plastic, reinforced plastic, or metal, having comparatively high hardness, compared to that of the seating pad 212. However, the material constituting the first plate 214 is not limited thereto. The first plate 214 functions to fix and support the seating pad 212.

The connector 216 is disposed between the first plate 214 and the first jig drive unit 218 to connect them to each other. In other words, the seating pad 212 and the first jig drive unit 218 may be connected and/or coupled to each other through the first plate 214 and the connector 216.

The first jig drive unit 218 may be provided to move the seating pad 212, and may be embodied, for example, using an actuator. The first jig drive unit 218 functions to move the seating pad 212 upward or downward.

The pair of clamping units 220 and 230 may be disposed on the respective opposite sides of the first jig 210 that face away from each other. For example, the pair of clamping units 220 and 230 may include a first clamping unit 220 and a second clamping unit 230 which are respectively disposed on the left and right sides of the first jig 210.

In an embodiment, the first clamping unit 220 may include a first clamp 222 disposed on (or disposed/provided at) a first side (e.g., the left side) of the first jig 210, a first clamp drive unit 226 configured to move the first clamp 222, and a first connector 224 disposed between the first clamp 222 and the first clamp drive unit 226.

The first clamp 222 includes a fixing part 222a designed to be openable or including an insert depression or the like. Although in FIGS. 4 and 5 there is illustrated the fixing part 222a formed of an upper plate and a lower plate, the structure, the shape, and/or the operating method of the fixing part 222a may be changed in various ways. For example, the first clamp 222 may be embodied in the form of a known clamp which may have any of various structures. Further, although in FIGS. 4 and 5 there is illustrated a structure in which the upper plate and the lower plate of the fixing part 222a are stepped from a main body of the first clamp 222, the present disclosure is not limited to this structure. For example, in an embodiment of the present disclosure, the upper plate and/or the lower plate of the fixing part 222a may extend from the main body of the first clamp 222 without forming a stepped structure.

The first connector 224 is disposed between the first clamp 222 and the first clamp drive unit 226 to connect them to each other. In other words, the first clamp 222 and the first clamp drive unit 226 are connected and/or coupled to each other by the first connector 224.

The first clamp drive unit 226 may be provided to move the first clamp 222 (e.g., in an upward or downward direction along the Z-axis and/or in a leftward or rightward direction along an X-axis, or in a diagonal direction), and may be embodied as any of various devices for movement. The first clamp drive unit 226 functions to move the first clamp 222 in the upward/downward direction and/or in the leftward/rightward direction.

In an embodiment, the second clamping unit 230 may include a second clamp 232 disposed on (or disposed/provided at) a second side (e.g., the right side) of the first jig 210, a second clamp drive unit 236 configured to move the second clamp 232, and a second connector 234 disposed between the second clamp 232 and the second clamp drive unit 236.

The second clamp 232 includes a fixing part 232a designed to be openable or including an insert depression or the like. The second clamp 232 having the foregoing structure may define a pair with the first clamp 222, and the first and second clamps 222 and 232 may be disposed facing each other, with the first jig 210, particularly, the seating pad 212, interposed therebetween. In an embodiment, the second clamp 232 may have substantially the same configuration as that of the first clamp 222. Therefore, further explanation of the second clamp 232 will be omitted.

The second connector 234 is disposed between the second clamp 232 and the second clamp drive unit 236 to connect them to each other. In other words, the second clamp 232 and the second clamp drive unit 236 are connected and/or coupled to each other by the second connector 234.

The second clamp drive unit 236 may be provided to move the second clamp 232, and may be embodied as any of various devices for movement, such as including an actuator. The second clamp drive unit 236 functions to move the second clamp 232 in the upward/downward direction and/or in the leftward/rightward direction. In an embodiment, the second clamp drive unit 236 may have a configuration substantially similar or the same as the first clamp drive unit 226, but is not limited thereto. For example, the kind, the structure, and/or the operating method of each of the first and the second clamp drive units 226 and 236 may be changed in various ways.

In an embodiment of the present disclosure, the pair of push members 242 and 252 along with the pair of clamps 222 and 232 may be disposed on the respective opposite sides of the seating pad 212. For example, the pair of push members 242 and 252 may include a first push member 242 disposed, along with the first clamp 222, on (or at) the first side (e.g., the left side) of the first jig 210, and a second push member 252 disposed, along with the second clamp 232, on (or at) the second side (e.g., the right side) of the first jig 210.

In other words, in an embodiment, the first push member 242 may be disposed around (or proximate) the first clamp 222, and the second push member 252 may be disposed around (or proximate) the second clamp 232.

Each of the first and the second push members 242 and 252 may have a size and/or a shape corresponding to that of the groove 212a formed in the corresponding side surface of the seating pad 212. In an embodiment, for example, each of the first and second push members 242 and 252 may have a thickness and/or a diameter less than that of the corresponding groove 212a of the seating pad 212 such that the first and the second push members 242 and 252 may be inserted into the respective grooves 212a.

In an embodiment, each of the first and the second push members 242 and 252 may include a roller. In an embodiment, the first and the second push members 242 and 252 may be integrally connected or mounted to the first and the second clamps 222 and 232, respectively, and may move concurrently (e.g., simultaneously) with the first and second clamps 222 and 232.

In an embodiment, for example, each of the first and the second push members 242 and 252 may be embodied in the form of a cylindrical rod inserted into holes or depressions formed in side surface parts of a corresponding one of the first and second clamps 222 and 232. However, the shape of the roller of each of the first and the second push members 242 and 252 is not limited to a cylindrical shape, and the shape may be changed in various ways. For example, in an embodiment of the present disclosure, the roller of each of the first and the second push members 242 and 252 may have a cross-sectional shape such as an elliptical or hexagonal cross-section.

As such, when the first and second push members 242 and 252 are respectively integrally connected or mounted to the first and second clamps 222 and 232, the first and second push members 242 and 252 may be respectively moved by the first and second clamp drive units 226 and 236. In this case, the first and second push members 242 and 252 may be moved concurrently (e.g., simultaneously) with the first and second clamps 222 and 232, respectively.

In an embodiment, the first and second clamp drive units 226 and 236 may move the first and second clamps 222 and 232 and the first and second push members 242 and 252 to positions adjacent to the seating pad 212, at a step (e.g., a predetermined step) of the lamination process. Particularly, at the step (e.g., the predetermined step), the first and second clamp drive units 226 and 236 may move the first and second push members 242 and 252 such that the first and second push members 242 and 252 are close to the respective grooves 212a formed in the side surfaces of the seating pad 212. Thereby, the opposite sides of the display panel 130 may be brought into close contact with the seating pad 212 and thus pre-formed.

Although in FIGS. 4 and 5 there is illustrated an embodiment in which the first and second clamps 222 and 232 are respectively moved by different drive units, i.e., the first and the second clamp drive units 226 and 236, the present disclosure is not limited thereto. For example, in an embodiment of the present disclosure, the first and second clamp drive units 226 and 236 may be integrated with each other.

Facing the first jig 210, the second jig 260 is disposed over the first jig 210. The second jig 260 includes the second plate 262 facing the seating pad 212. In an embodiment, the second jig 260 may further include a second jig drive unit 266 provided to move the second plate 262 (e.g., upward or downward), and a connector 264 disposed between the second plate 262 and the second jig drive unit 266. In an embodiment, the second jig drive unit 266, etc. may be regarded as separate components from the second jig 260.

In an embodiment, the second plate 262 may include, on a surface thereof facing the seating pad 212, a fixing unit configured to fix the cover window 110, etc. in place. In an embodiment, for example, the fixing unit may include a suction part 262a provided to prevent or substantially prevent the cover window 110 from being undesirably displaced from its desired position. In this case, the manufacturing apparatus 200 may further include a suction pump, etc. (not shown) provided to suck air from the suction part 262a. For example, the suction pump may be disposed outside a chamber in which the lamination process of joining the cover window 110 with the display panel 130 is performed. In addition, the structure and/or the operating method of the fixing unit for fixing the cover window 110 in place may be changed in various ways. For example, in an embodiment, the fixing unit may be embodied in a separate frame included in the second jig 260 or using an adhesive member having adhesive force.

The second plate 262 may have a shape corresponding to that of the seating pad 212. For example, to embody a display device (e.g., the display device 100 of FIGS. 1 and 2) having bent parts, the seating pad 212 and the second plate 262 may have shapes corresponding to the shape of the cover window 110 including the bent parts on the respective opposite sides thereof. For example, each of side surfaces (e.g., inner sidewalls) of the second plate 262 may include a bent part 262b having substantially the same curvature and/or shape as that of the cover window 110. The bent part 212b formed in the upper end region of each of the opposite side surfaces of the seating pad 212 may have a shape corresponding to the associated bent part 262b of the second plate 262. Here, at least one region of the bent part 212b may have a curvature greater than that of the bent part 262b of the second plate 262, taking into account a displacement which may be caused by pushing force. For example, the seating pad 212 and the second plate 262 may be designed such that the display panel 130 seated on the seating pad 212 may be pre-formed in a shape corresponding to the inner surface of the cover window 110, e.g., to have substantially the same shape and/or curvature as that of the inner surface of the cover window 110.

In an embodiment, the second plate 262 may have a hardness greater than that of the seating pad 212. For example, when the upper end region of the seating pad 212 is made of a flexible and elastic material, such as silicon, rubber, or flexible synthetic resin, the second plate 262 may be made of a comparatively hard material, such as plastic, reinforced plastic, or metal having a comparatively high hardness, compared to that of the seating pad 212. However, the material constituting the second plate 262 may be changed in various ways rather than being limited to the foregoing examples.

The connector 264 is disposed between the second plate 262 and the second jig drive unit 266 to couple them to each other. In other words, the second plate 262 and the second jig drive unit 266 may be connected and/or coupled to each other by the connector 264.

The second jig drive unit 266 may be provided to move the second plate 262, and may be embodied, for example, in the form of an actuator. The second jig drive unit 266 may move the second plate 262 upward or downward. In an embodiment, the second jig drive unit 266 may have a configuration substantially similar or the same as that of the first jig drive unit 218, but is not limited thereto. For example, the kind, the structure, and/or the operating method of each of the first and second jig drive units 218 and 266 may be changed in various ways.

In an embodiment, only any one of the first and second jig drive units 218 and 266 may be provided. In this case, the lamination process may be performed by moving only one of the first jig 210 or the second jig 260 upward or downward.

The apparatus 200 for manufacturing the display device in accordance with the above-described embodiments makes it possible to reliably attach the display panel 130 to the cover window 110 having the bent parts. A method (lamination method) of joining the cover window 110 with the display panel 130 using the manufacturing device 200 having the above-mentioned configuration will be described in further detail later herein.

Figure 6:
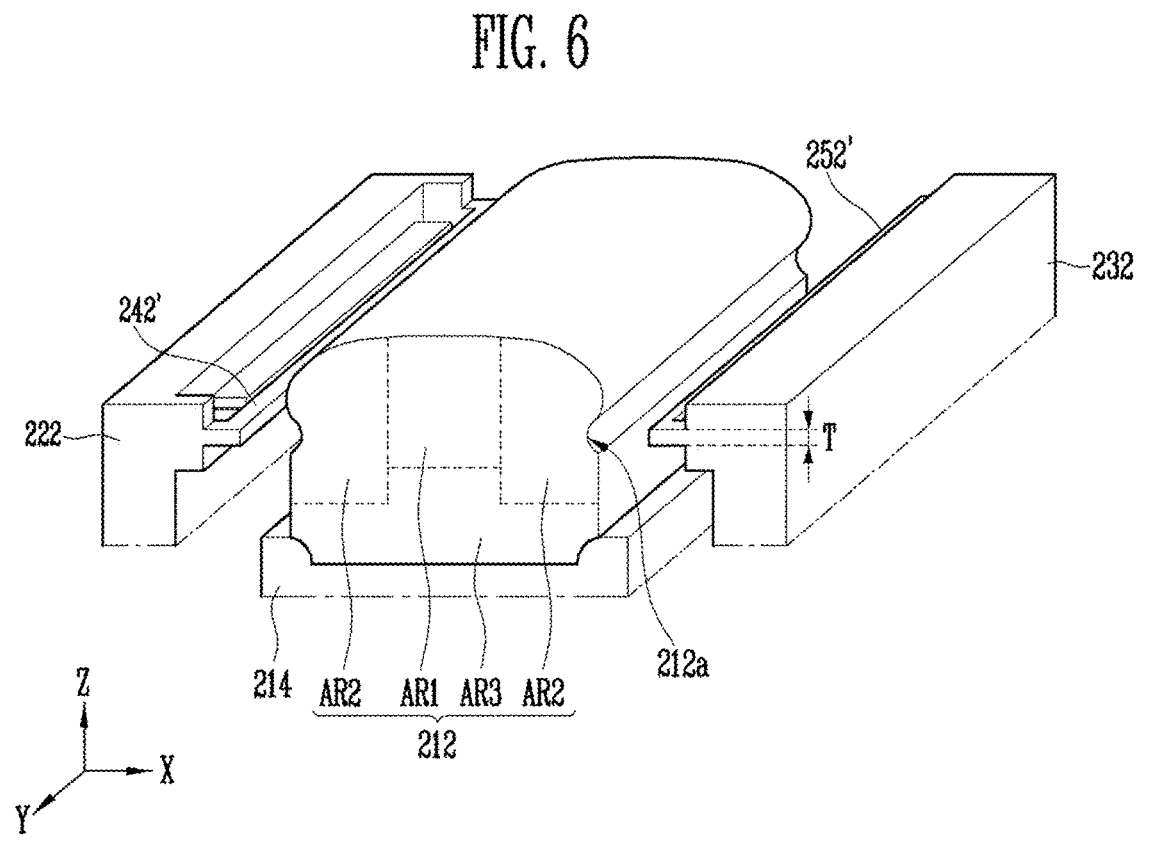

FIG. 6 is a perspective view illustrating a portion of an apparatus for manufacturing a display device in accordance with an embodiment of the present disclosure. In FIG. 6, the same reference numerals are used to designate components similar or the same as those of the embodiment of FIG. 5, and further explanation thereof will be omitted.

Referring to FIG. 6, the first and the second push members 242 and 252 that were described as including rollers in an embodiment of FIGS. 4 and 5 may, in another embodiment, include bar-type push members 242' and 252'. For example, each of the first and the second push members 242' and 252' according to the present embodiment may include a flat bar extending from an end of the corresponding one of the first and the second clamps 222 and 232.

In an embodiment, a thickness (T) of the bar may be less than a diameter of the roller described in the previous embodiment. In this case, opposite edges of a guide film attached with the display panel 130 may be more easily pushed into the respective grooves 212a of the seating pad 212 by the first and the second push members 242' and 252'. As a result, the display panel 130 may be more precisely pre-formed.

Figure 7:
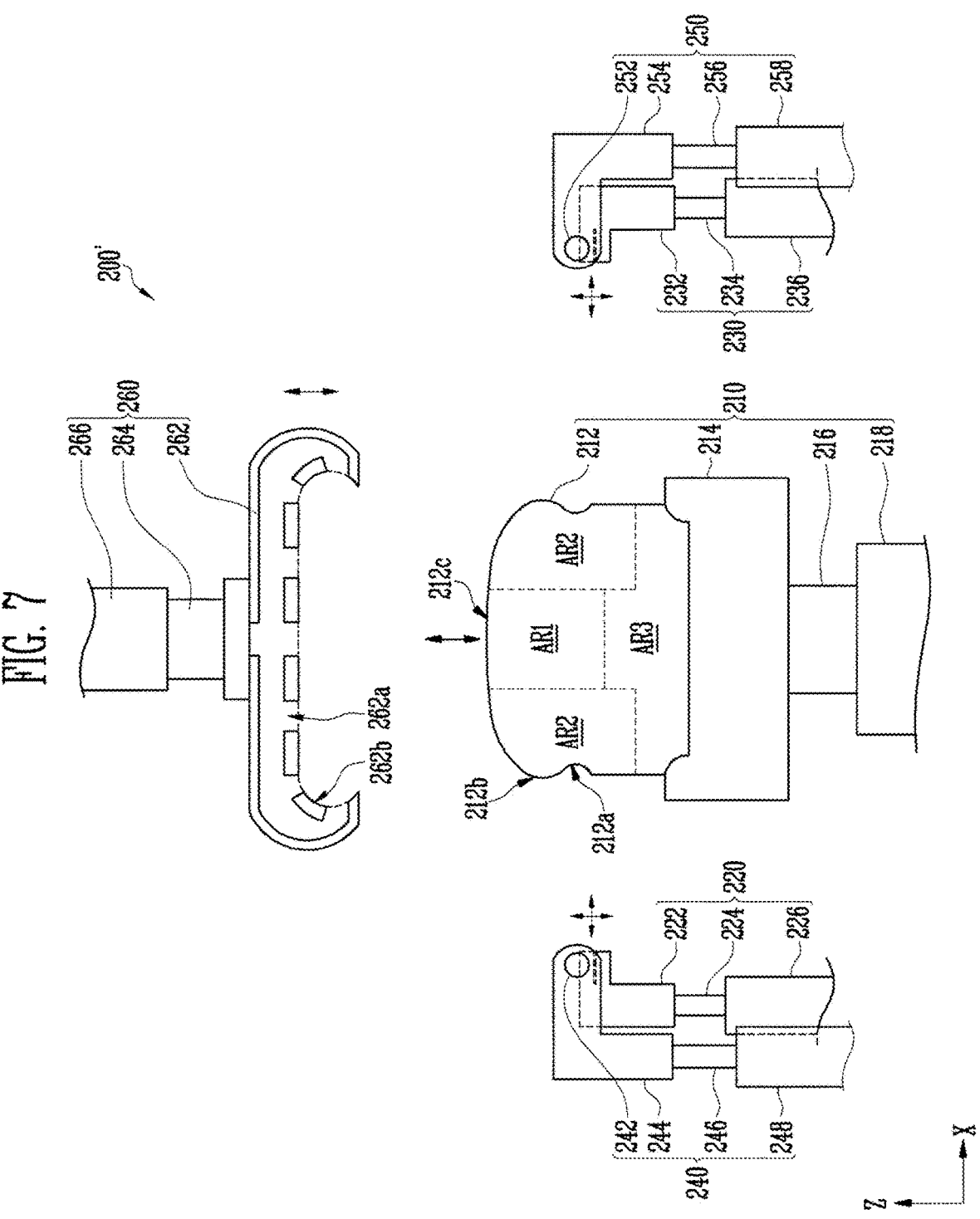
FIG. 7 is a diagram illustrating an apparatus for manufacturing a display device in accordance with an embodiment of the present disclosure.

FIG. 7 is a diagram illustrating an apparatus 200' for manufacturing a display device in accordance with an embodiment of the present disclosure. In FIG. 7, the same reference numerals are used to designate components similar or the same as those of the embodiment of FIG. 4, and further explanation thereof will be omitted.

Referring to FIG. 7, in an embodiment, first and second clamps 222 and 232 and first and second push members 242 and 252 may be provided separately from each other and respectively operated by different drive units. For example, in the present embodiment, the first and second push members 242 and 252 may be respectively separated from the first and second clamping units 220 and 230. Furthermore, a pair of push units 240 and 250 respectively having the first push member 242 and the second push member 252 may be respectively disposed around the first and second clamping unit 220 and 230.

For example, the first push unit 240 is disposed around the first clamping unit 220. In an embodiment, the first push unit 240 may include the first push member 242, a main body 244 provided with the first push member 242, and a connector 246 and a first push drive unit 248 which are successively connected and/or coupled to the main body 244. In this case, the first push member 242 may be moved independently from the first clamp 222 in the upward/downward direction and/or in the leftward/rightward direction by the first push drive unit 248.

The second push unit 250 may be disposed around the second clamping unit 230. In an embodiment, the second push unit 250 may include the second push member 252, a main body 254 provided with the second push member 252, and a connector 256 and a second push drive unit 258 which are successively connected and/or coupled to the main body 254. In this case, the second push member 252 may be moved independently from the second clamp 232 in the upward/downward direction and/or in the leftward/rightward direction by the second push drive unit 258.

In the apparatus 200' for manufacturing the display device in accordance with the present embodiment, the first and second clamps 222 and 232 and the first and second push members 242 and 252 may be moved independently from each other. Hence, the degrees of freedom in movement of the first and second clamps 222 and 232 and the first and second push members 242 and 252 may be markedly increased.

Figure 8:
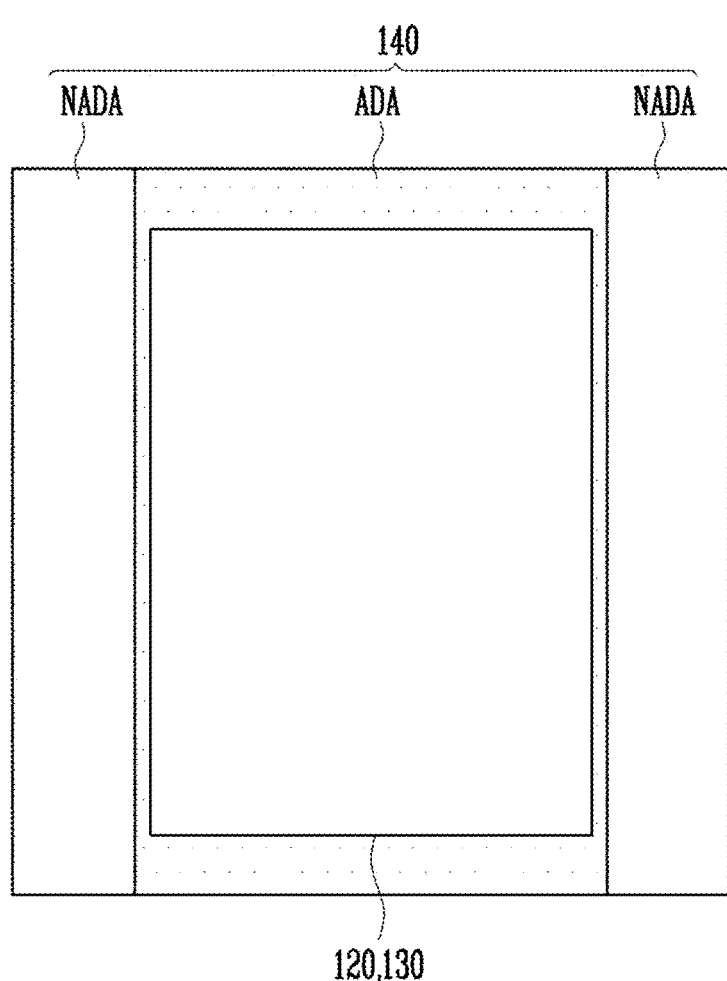
FIG. 8 is a diagram illustrating a guide film and a display panel in accordance with an embodiment of the present disclosure.
Figure 8:
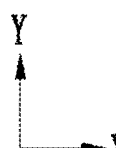

FIG. 8 is a diagram illustrating a guide film 140 and a display panel 130 in accordance with an embodiment of the present disclosure.

Referring to FIG. 8, the guide film 140 may include an adhesive area ADA to which adhesive is applied, and non-adhesive areas NADA, to which no adhesive is applied, or each of which includes a non-adhesive cover. The display panel 130 may be attached to a corresponding surface of the guide film 140. Further, an adhesive layer 120 may be formed on a corresponding surface (e.g., a front surface) of the display panel 130.

In an embodiment, the guide film 140 may be a lamination sheet, such as a UV adhesive sheet formed to be separable using UV rays, but is not limited thereto. The guide film 140 may be used, e.g., in a lamination process of attaching the display panel 130 to the cover window 110. In an embodiment, the guide film 140 may also be used in a process of manufacturing the display panel 130. The guide film 140 may have a width greater than that of the display panel 130, at least with respect to a transverse direction (e.g., an X-axis direction). For example, the width of the adhesive area ADA of the guide film 140 may be greater than that of the display panel 130. Therefore, when the display panel 130 is disposed in a central portion of the guide film 140 with respect to the transverse direction, the non-adhesive areas NADA provided on respective opposite ends of the guide film 140 may be exposed.

In an embodiment of the present disclosure, the guide film 140 in which the display panel 130 and the adhesive layer 120 are successively disposed on the adhesive area ADA including the central portion of the guide film 140 may be prepared prior to the lamination process of attaching the display panel 130 to the cover window 110. Thereafter, the first and second clamps 222 and 232 may hold the non-adhesive areas NADA provided on the opposite ends of the guide film 140. The first and second push members 242 and 252 push the guide film 140 and bring the guide film 140 into contact with the surface of the seating pad 212. Then, the guide film 140 is deformed to correspond to the shape of the seating pad 212, whereby the display panel (e.g., a flexible display panel) 130 attached to the guide film 140 may be pre-formed to have a curvature corresponding to the shape of the seating pad 212.

Figure 9:
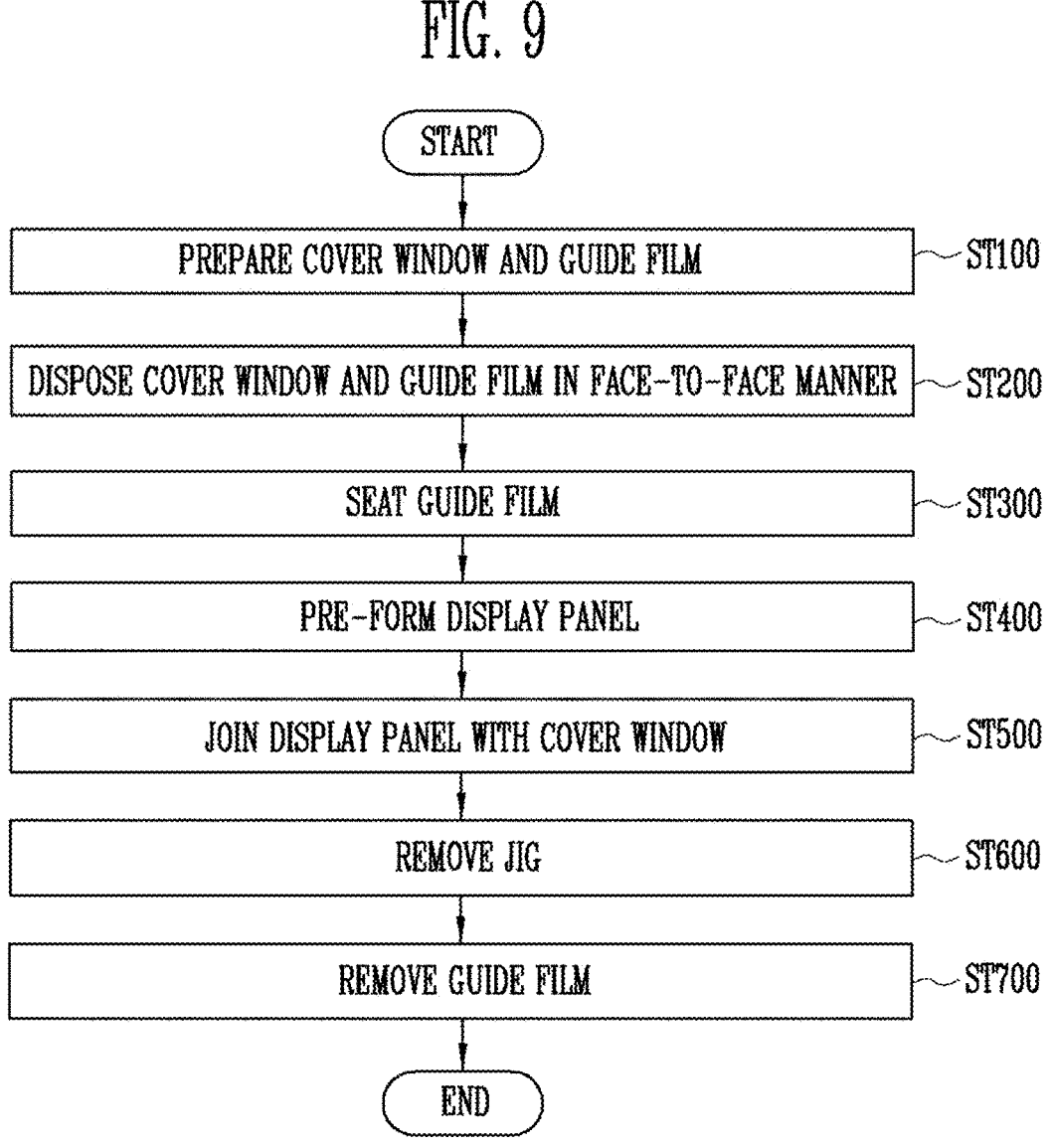
FIG. 9 is a flowchart illustrating a method of manufacturing a display device in accordance with an embodiment of the present disclosure.

FIG. 9 is a flowchart illustrating a method of manufacturing a display device in accordance with an embodiment of the present disclosure. Herein, a process (e.g., a lamination process) of joining a display panel with a cover window using a guide film will be described by steps with reference to FIG. 9.

<ST100: Preparing the Cover Window and the Guide Film>

The cover window 110 and the guide film 140 on one surface of which the display panel 130 and the adhesive layer 120 are disposed are prepared.

In an embodiment, the step of preparing the cover window 110 may include the step of manufacturing and/or preparing the cover window 110 having bent parts on respective opposite sides thereof. For example, the cover window 110 may include side surface parts 110b, each of which is embodied in the form of the bent part having an angle (θ) of 90° or more and/or a comparatively large curvature corresponding to the angle (θ).

In an embodiment, the step of preparing the guide film 140 on which the display panel 130 and the adhesive layer 120 are disposed may include the step of providing the guide film 140 including a base film and an adhesive applied to an adhesive area ADA of the base film, and the step of attaching and/or forming the display panel 130 and the adhesive layer 120 on a surface of the guide film 140. In an embodiment, the step of attaching and/or forming the display panel 130 and the adhesive layer 120 may include the step of attaching the display panel 130 to the adhesive area ADA formed on the central portion of the guide film 140, such that the non-adhesive areas NADA formed on the respective opposite ends of the guide film 140 are exposed, and the step of forming the adhesive layer 120 on the display panel 130 before or after the attaching of the display panel 130.

<ST200: Disposing the Cover Window and the Guide Film in a Face-to-Face Manner>

Subsequently, the cover window 110 and the guide film 140 are disposed or arranged facing each other. Here, the cover window 110 and the guide film 140 are disposed or arranged such that the surface (e.g., the front surface) of the guide film 140 on which the display panel 130 and the adhesive layer 120 are formed faces the cover window 110. In other words, the cover window 110 and the guide film 140 are disposed facing each other such that the adhesive layer 120 faces the cover window 110.

In an embodiment, the cover window 110 and the guide film 140 may be respectively moved by the second jig 260 and the first and second clamping units 220 and 230 and thus aligned with each other such that they face each other. Further, when the second jig 260 mounted with the cover window 110 moves, at least one of the first and second clamping units 220 and 230 and the first jig 210 may also be moved in response to the movement of the second jig 260.

<ST300: Seating the Guide Film>

Thereafter, the guide film 140 is seated on the seating pad 212 of the first jig 210. To seat the guide film 140 on the seating pad 212, the first and second clamps 222 and 232 and/or the seating pad 212 may be moved.

<ST400: Pre-Forming the Display Panel>

Thereafter, the opposite ends of the guide film 140 are brought into close contact with the respective side surfaces of the seating pad 212 by the first and the second push members 242 and 252. Thereby, the display panel 130 may be pre-formed in a shape corresponding to the cover window 110.

<ST500: Joining the Display Panel With the Cover Window>

Subsequently, by moving the first jig 210 and/or the second jig 260, the adhesive layer 120 is brought into contact with the cover window 110 and pressure is applied to the cover window 110 and the display panel 130, thus joining the display panel 130 with the cover window 110.

<ST600: Removing the Jig>

Thereafter, the first jig 210 and/or the second jig 260 are removed from the display panel 130 and the cover window 110. In an embodiment, the first and second jigs 210 and 260 may be sequentially removed from the display panel 130 and the cover window 110.

<ST700: Removing the Guide Film>

Subsequently, the guide film 140 is removed from the display panel 130. For example, in the case in which the guide film 140 is embodied in the form of a UV adhesive sheet, the guide film 140 may be removed from the display panel 130 by applying UV rays to the guide film 140.

In an embodiment, steps ST200 to ST600 of the above-mentioned steps may be performed in a chamber of the manufacturing apparatus 200 or 200' including the first and second jigs 210 and 260. Steps ST200 to ST600 will be described in more detail with reference to FIGS. 10A to 10F.

FIGS. 10A to 10F sequentially illustrate a method of manufacturing a display device in accordance with an embodiment of the present disclosure, for example, sequentially illustrate a process of operating the manufacturing apparatus 200 shown in FIG. 4.

Figure 10A:
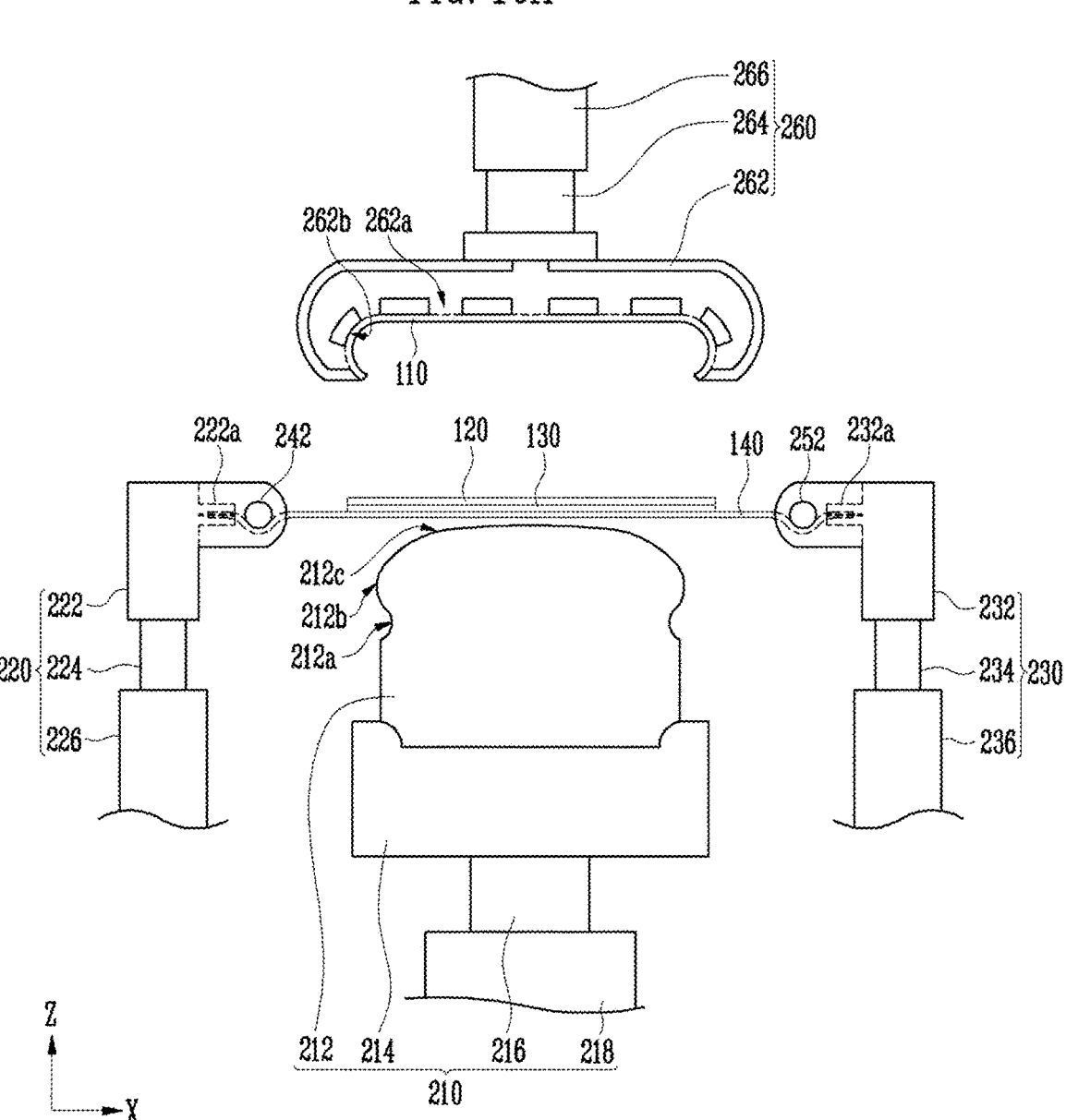

After the step of preparing the cover window 110 and the guide film 140 has been completed, as shown in FIG. 10A, the cover window 110 and the guide film 140 may be disposed facing each other such that the adhesive layer 120 faces the cover window 110.

In an embodiment, the step of disposing the cover window 110 and the guide film 140 in a face-to-face manner may include the step of transferring the cover window 110 toward the upper portion of the first jig 210 using the second jig 260, and the step of disposing the guide film 140 between the first jig 210 and the cover window 110 while the first and second clamps 222 and 232 hold the respective opposite ends of the guide film 140. In an embodiment, the cover window 110 may be attached by suction to the corresponding surface of the second plate 262 by the suction part 262a. The guide film 140 may be transferred to a position over the seating pad 212 while the non-adhesive areas NADA of the opposite ends of the guide film 140 are respectively fixed to the first and the second clamps 222 and 232.

In other words, the cover window 110 and the guide film 140 may be respectively moved by the second jig 260 and the first and second clamping units 220 and 230 and thus aligned with each other such that they face each other. In an embodiment, the first jig 210, the first and the second clamping units 220 and 230, and/or the second jig 260 may move corresponding with each other. For example, when the second jig 260 mounted with the cover window 110 is moved, the first and second clamps 222 and 232 and/or the first jig 210 may also be moved by degrees corresponding to the distance and/or the direction of the movement of the second jig 260.

Figure 10B:
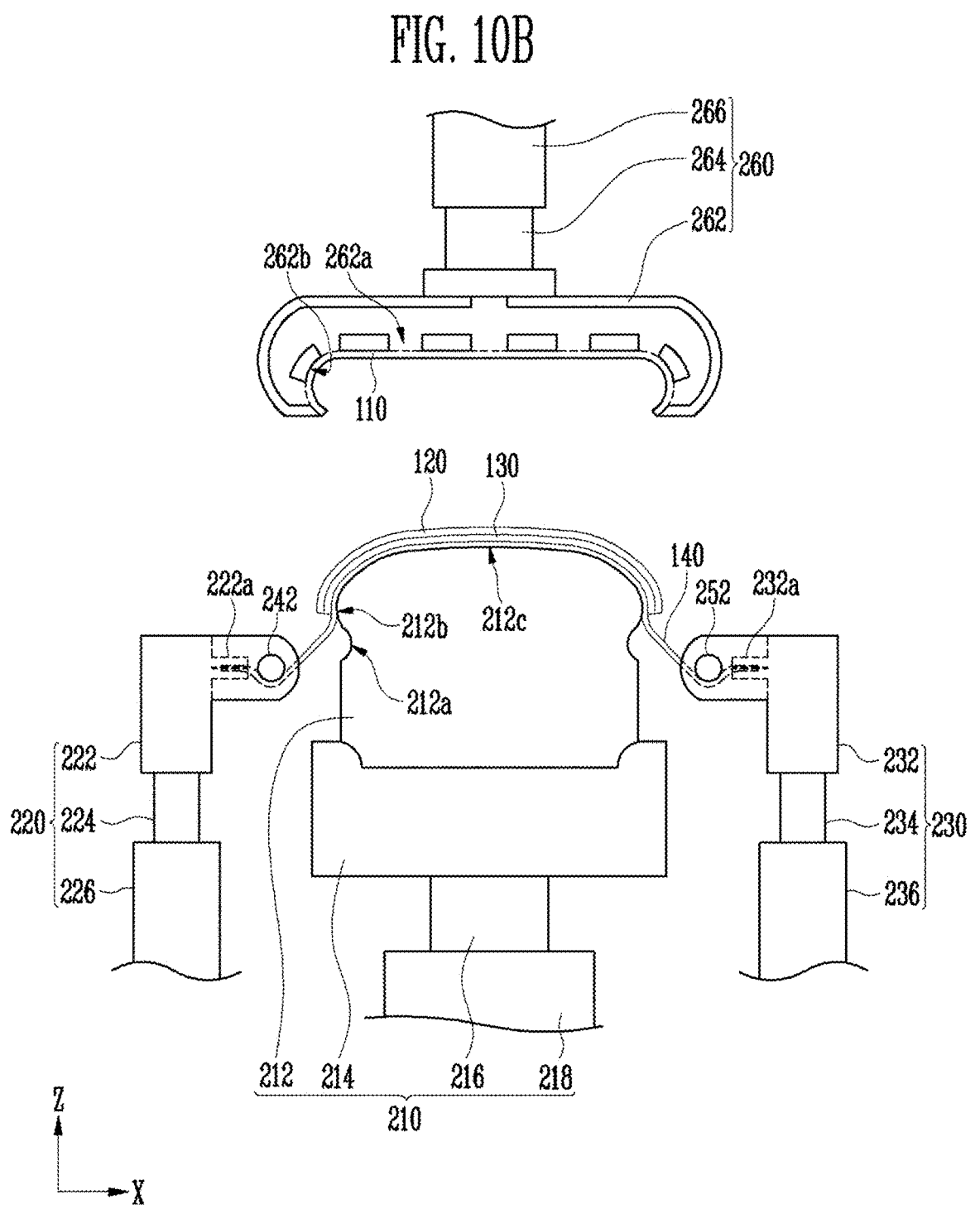

Thereafter, as shown in FIG. 10B, the guide film 140 may be seated onto the seating pad 232 by moving the first and second clamps 222 and 232 and/or the seating pad 212. For example, by moving the first and second clamps 222 and 232 downward and/or moving the seating pad 212 upward, at least one of the first and second clamps 222 and 232 and the seating pad 212 may be transferred such that a rear surface of the guide film 140 comes into close contact with the upper surface of the seating pad 212.

Figure 10C:
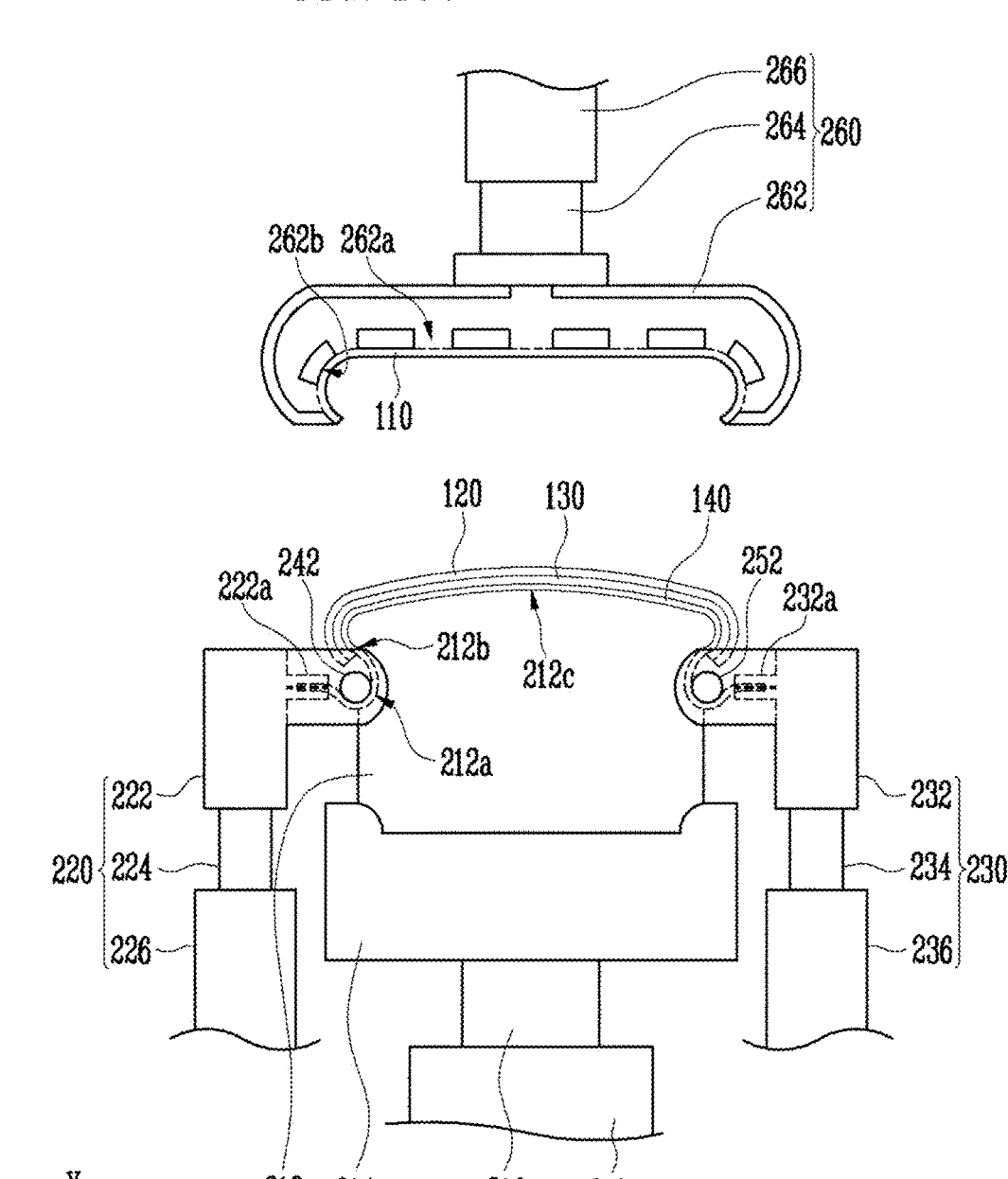

Subsequently, as shown in FIG. 10C, the display panel 130 may be pre-formed by bringing the opposite ends of the guide film 140 into close contact with the respective opposite side surfaces of the seating pad 212 using the first and the second push members 242 and 252. In an embodiment, the step of pre-forming the display panel 130 may be a step of deforming the display panel 130 in a shape corresponding to that of the cover window 110.

In an embodiment, the step of pre-forming the display panel 130 may include a step of concurrently (e.g., simultaneously) moving the first and second clamps 222 and 232 and the first and second push members 242 and 252 to positions close to the opposite side surfaces of the seating pad 212. Alternatively, in an embodiment, the step of pre-forming the display panel 130 may include a step of individually and/or independently moving the first and second clamps 222 and 232 and the first and second push members 242 and 252 to positions close to the opposite side surfaces of the seating pad 212.

For example, the step of pre-forming the display panel 130 may include a step of disposing the first and second push members 242 and 252 on respective opposite sides of the seating pad 212, and the step of moving the first and second push members 242 and 252 toward the respective grooves 212a formed in the opposite side surfaces of the seating pad 212 and pressing the opposite ends of the guide film 140 such that the opposite ends of the guide film 140 come into contact with the respective opposite side surfaces of the seating pad 212. For example, the opposite ends of the guide film 140 may be brought into close contact with the respective bent parts 212b of the seating pad 212 by moving the first and the second push members 242 and 252 and/or corresponding regions of the guide film 140 into the respective grooves 212a formed in the opposite side surfaces of the seating pad 212. Here, the seating pad 212 may have a shape corresponding to that of the cover window 110. Particularly, each of the bent parts 212b of the seating pad 212 may have a shape corresponding to that of the corresponding one of the side surface parts 110b of the cover window 110. Hence, the display panel 130 may be pre-formed to have curvatures corresponding to the shape of the cover window 110, particularly, the side surface parts 110b of the cover window 110.

Figure 10D:
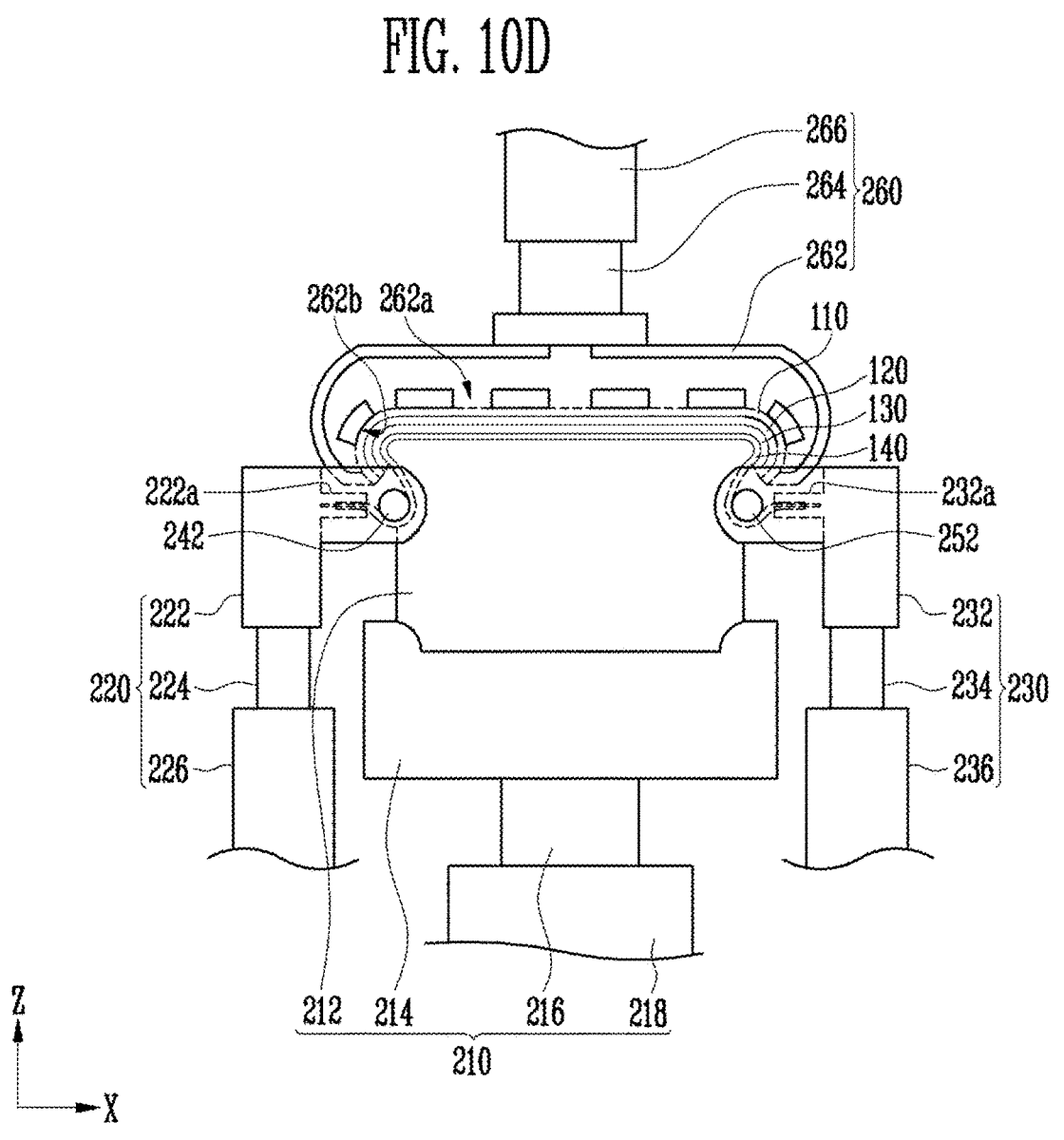

Subsequently, as shown in FIG. 10D, by moving the first jig 210 and/or the second jig 260, the adhesive layer 120 is brought into contact with the rear surface of the cover window 110 and pressure is applied to the cover window 110 and the display panel 130, thus joining the display panel 130 with the cover window 110. For example, the cover window 110 and the display panel 130 may be joined with each other by moving the first and second clamps 222 and 232 along with the seating pad 212. In an embodiment, since the first and second push members 242 and 252 also move upward along with the first and the second clamps 222 and 232, for example, the display panel 130 or the seating pad 212 may be prevented or substantially prevented from being damaged by the first and the second push members 242 and 252. In the case in which the first and the second push members 242 and 252 are operated independently from the first and the second clamps 222 and 232, damage to the display panel 130 or the seating pad 212 may be prevented or substantially prevented, for example, by synchronizing the timings of the upward movement of the seating pad 212, the first and second clamps 222 and 232, and the first and second push members 242 and 252.

In an embodiment, the pressure to be applied when the cover window 110 and the display panel 130 are joined with each other may be set within a load range capable both of preventing or substantially preventing the cover window 110 or the display panel 130 from being damaged and of securing a sufficient joining force between the cover window 110 and the display panel 130. In an embodiment, for example, the load range may be from 0.3 MPa to 0.5 MPa, but is not limited thereto. For instance, the load range may be changed depending on the materials, the hardnesses, etc. of the cover window 110, the adhesive layer 120, and/or the display panel 130.

Figure 10E:
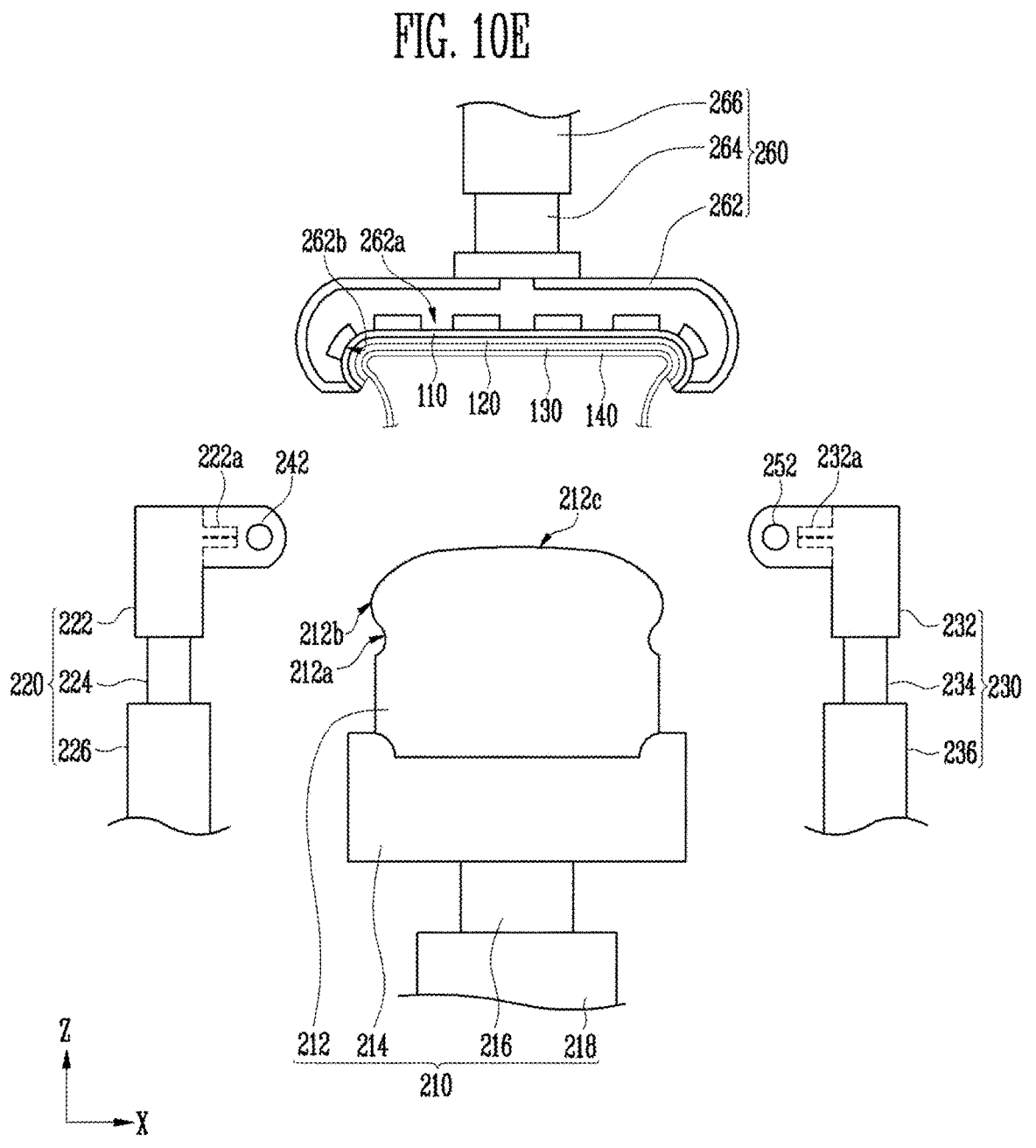

Thereafter, as shown in FIG. 10E, the first and second clamps 222 and 232 are separated from the guide film 140. The first and second clamps 222 and 232, the first and second push members 242 and 252, and the first jig 210 are moved away from the guide film 140. Thereby, the guide film 140 is removed from the first jig 210.

Figure 10F:
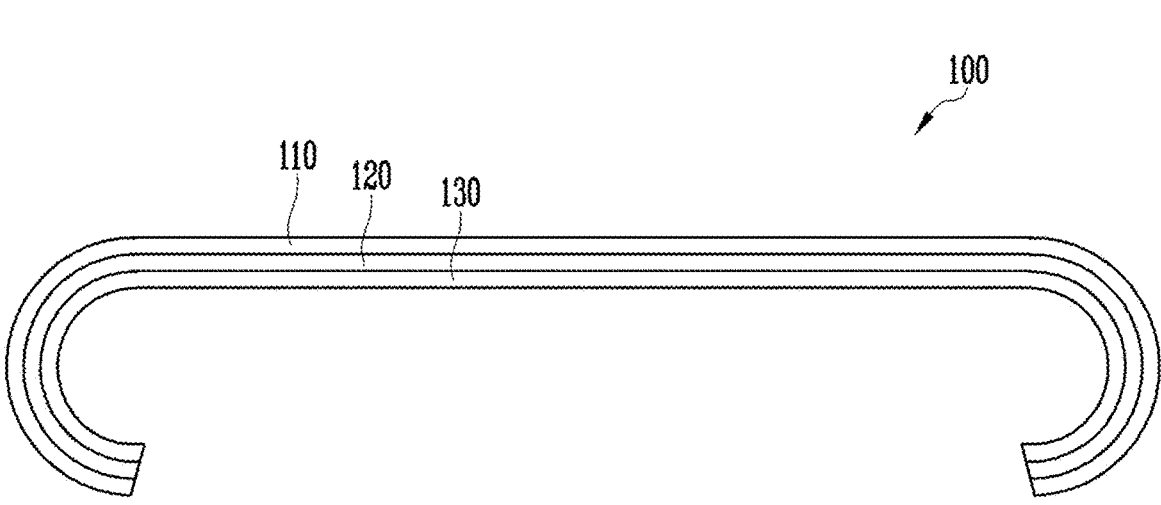

Thereafter, the guide film 140 and the second jig 260 are removed from the cover window 110 and the display panel 130, thus completing the process of joining the display panel 130 with the cover window 110. As a result, as shown in FIG. 10F, the manufacture of the display device 100 is completed.

In the display device manufacturing apparatus (e.g., the lamination device 200 or 200') and the display device manufacturing method (e.g., the lamination method) using the manufacturing apparatus in accordance with embodiments of the present disclosure, the display panel 130 may be pre-formed in a shape substantially the same or similar to the cover window 110 before the display panel 130 is attached to a surface of the cover window 110. As a result, even when each of the side surface parts 110b of the cover window 110 is embodied in the form of the bent part which is curved or bent at an angle (e.g., a predetermined angle), a phenomenon may be prevented or mitigated, in which the adhesive layer 120 is scraped from the side surface parts 110b of the cover window 110 or an air bubble is formed in the adhesive layer 120 during the lamination process of joining the display panel 130 with the cover window 110. According to the display device manufacturing apparatus 200 and the display device manufacturing method using the manufacturing apparatus, the display panel 130 may be reliably attached to the cover window 110 even though the cover window 110 has the bent parts, each of which is curved or bent at an angle of 90° or more or to a degree corresponding to the angle. Thereby, the quality of adhesion may be enhanced, and a product defect rate may be reduced. As a result, the productivity and the reliability of the display device 100 may be improved.

While the spirit and scope of the present disclosure are described in connection with some exemplary embodiments, it should be noted that the above-described embodiments are merely descriptive and should not be considered limiting. It should be understood by those skilled in the art that various changes, substitutions, and alterations may be made herein without departing from the scope of the disclosure as set forth in the following claims.

The scope of the present disclosure is not limited by the above detailed descriptions of the present specification, and should be defined by the accompanying claims. Furthermore, all changes or modifications of the present disclosure derived from the meanings and scope of the claims, and equivalents thereof should be construed as being included in the scope of the present disclosure.

What is claimed is:

1. A method of manufacturing a display device, the method comprising:
    preparing a cover window including a bent part, a guide film including a first surface and a second surface, and a display panel on the first surface of the guide film;
    disposing the guide film on a seating pad of a first jig such that the second surface of the guide film faces in a downward direction; and pre-forming the display panel such that the display panel has a predetermined shape corresponding to a shape of the cover window, wherein the pre-forming includes:

a first pushing in which a push member pushes the first surface of the guide film in the downward direction, and a second pushing in which the push member pushes the first surface of the guide film in a horizontal direction, wherein in the pre-forming, the push member does not physically contact the display panel, wherein the seating pad includes a groove, and wherein the second pushing includes:

providing at least a portion of the guide film into the groove; and contacting at least a portion of the second surface of the guide film and an inner surface of the groove.

2. The method of claim 1, wherein in the first pushing and the second pushing, the pushing member and the display panel are disposed to be spaced apart from each other on the first surface of the guide film.

3. The method of claim 1, wherein the pre-forming includes pre-forming the display panel without being directly pushed by the pushing member.

4. The method of claim 1, wherein the first pushing includes pushing an edge portion of the guide film in which the display panel is not disposed such that the display panel is adjacent to an upper surface of the seating pad.

5. The method of claim 4, wherein the second pushing includes contacting the edge portion of the guide film to the groove of the seating pad.

6. The method of claim 5, wherein the second pushing includes arranging the pushing member at a height corresponding to a position of the groove in the horizontal direction.

7. The method of claim 1, wherein the pushing member includes a roller shape or a bar shape.

8. The method of claim 1, further comprising:

preparing an adhesive layer facing the cover window;

transferring the cover window to a position over the first jig using a second jig; and joining the display panel with the cover window by bringing the adhesive layer into contact with the cover window.

9. The method of claim 8, further comprising removing the guide film from the first jig after the joining of the display panel with the cover window.

10. The method of claim 1, wherein each of the first pushing and the second pushing includes: applying an external force to both edge portions of the guide film.

11. The method of claim 1, wherein the second pushing is performed after the first pushing.

12. A method of manufacturing a display device, the method comprising:

preparing a cover window including a bent part, a guide film including a first surface and a second surface, and a display panel on the first surface of the guide film;

disposing the guide film on a seating pad of a first jig such that the second surface of the guide film faces in a downward direction; and pre-forming the display panel such that the display panel has a predetermined shape corresponding to a shape of the cover window, wherein the pre-forming includes:

a first pushing in which a push member pushes the first surface of the guide film in the downward direction, and a second pushing in which the push member pushes the first surface of the guide film in a horizontal direction, wherein in the pre-forming, the push member does not physically contact the display panel, and wherein the seating pad includes an elastic material.

13. The method of claim 12, wherein a central portion of the seating pad has a lower hardness than an edge portion of the seating pad.

14. A method of manufacturing a display device, the method comprising:

preparing a cover window including a bent part, a guide film including a first surface and a second surface, and a display panel on the first surface of the guide film;

disposing the guide film on a seating pad of a first jig such that the second surface of the guide film faces in a downward direction; and pre-forming the display panel such that the display panel has a predetermined shape corresponding to a shape of the cover window, wherein the pre-forming includes:

a first pushing in which a push member pushes the first surface of the guide film in the downward direction, and a second pushing in which the push member pushes the first surface of the guide film in a horizontal direction, wherein in the pre-forming, the push member does not physically contact the display panel, and wherein the disposing the guide film includes holding opposite ends of the guide film using a clamp and arranging the guide film between the first jig and the cover window.

15. The method of claim 14, wherein the second jig includes a fixing part configured to fix the cover window, and includes a suction part.

* * * * *